(12) United States Patent
Boratav et al.

(10) Patent No.: US 10,392,288 B2
(45) Date of Patent: Aug. 27, 2019

(54) METHOD AND APPARATUS FOR REDUCING SHEET WIDTH ATTENUATION OF SHEET GLASS

(71) Applicant: CORNING INCORPORATED, Corning, NY (US)

(72) Inventors: Olus Naili Boratav, Ithaca, NY (US); Gaozhu Peng, Horseheads, NY (US); William Anthony Whedon, Corning, NY (US)

(73) Assignee: Corning Incorporated, Corning, NY (US)

( * ) Notice: Subject to any disclaimer, the term of this patent is extended or adjusted under 35 U.S.C. 154(b) by 124 days.

(21) Appl. No.: 15/516,550

(22) PCT Filed: Oct. 1, 2015

(86) PCT No.: PCT/US2015/053415
§ 371 (c)(1),
(2) Date: Apr. 3, 2017

(87) PCT Pub. No.: WO2016/054325
PCT Pub. Date: Apr. 7, 2016

(65) Prior Publication Data
US 2018/0265391 A1    Sep. 20, 2018

Related U.S. Application Data

(60) Provisional application No. 62/059,528, filed on Oct. 3, 2014.

(51) Int. Cl.
*C03B 17/06*    (2006.01)

(52) U.S. Cl.
CPC .......... *C03B 17/068* (2013.01); *C03B 17/064* (2013.01)

(58) Field of Classification Search
CPC ...................................................... C03B 17/00
See application file for complete search history.

(56) References Cited

U.S. PATENT DOCUMENTS

| | | |
|---|---|---|
| 1,586,618 A | 6/1926 | Ferngren |
| 1,616,371 A | 2/1927 | Howard |
| (Continued) | | |

FOREIGN PATENT DOCUMENTS

| | | |
|---|---|---|
| CN | 203429044 U | 2/2014 |
| JP | 03335291 B2 | 10/2002 |
| (Continued) | | |

OTHER PUBLICATIONS

English Translation of CN201580066138.4 First Office Action dated Jan. 24, 2019, China Patent Office, 16 Pgs.

*Primary Examiner* — Cynthia Szewczyk
(74) *Attorney, Agent, or Firm* — Ryan T. Hardee

(57) ABSTRACT

Disclosed herein are apparatuses and methods for drawing sheet glass. More particularly, one or more sets of edge rolls can be configured to have a rotation axis angled away from a line orthogonal to the direction of flow of a ribbon of glass and positioned so as to contact the glass in the viscous region of the draw. Through control over the orientation and position of the one or more sets of edge rolls, sheet width attenuation may be eliminated, thickness of the beads that form along the edges of the glass sheet may be reduced, and instabilities associated with sheet width variation may be eliminated.

22 Claims, 5 Drawing Sheets

(56) References Cited

U.S. PATENT DOCUMENTS

| | | | |
|---|---|---|---|
| 3,338,696 | A | 8/1967 | Dockerty |
| 3,419,374 | A | 12/1968 | Offenbacher et al. |
| 3,533,772 | A | 10/1970 | Itakura et al. |
| 3,537,834 | A | 11/1970 | Simon |
| 3,661,548 | A | 5/1972 | Ito et al. |
| 3,682,609 | A | 8/1972 | Dockerty |
| 4,460,397 | A | 7/1984 | Kapura et al. |
| 6,896,646 | B2 | 5/2005 | Kaiser et al. |
| 8,047,085 | B2 | 11/2011 | Cady et al. |
| 8,146,388 | B2 | 4/2012 | Anderson et al. |
| 8,528,364 | B2 | 9/2013 | Anderson et al. |
| 9,061,932 | B2 | 6/2015 | Anderson et al. |
| 2005/0268657 | A1 | 12/2005 | Adamowicz et al. |
| 2005/0268658 | A1 | 12/2005 | Adamowicz et al. |
| 2009/0107182 | A1* | 4/2009 | Anderson ............. C03B 17/068 65/90 |
| 2009/0314032 | A1 | 12/2009 | Tomamoto et al. |
| 2011/0100057 | A1 | 5/2011 | Gaylo |
| 2011/0167873 | A1* | 7/2011 | Anderson ............. C03B 17/068 65/91 |
| 2011/0239708 | A1 | 10/2011 | Nishiura et al. |
| 2012/0144864 | A1 | 6/2012 | Tsuda et al. |
| 2013/0319050 | A1 | 12/2013 | Agrawal et al. |
| 2013/0340481 | A1 | 12/2013 | Anderson et al. |
| 2014/0075994 | A1 | 3/2014 | Anderson et al. |
| 2014/0352356 | A1 | 12/2014 | Anderson et al. |
| 2015/0266765 | A1 | 9/2015 | Nishiura et al. |
| 2016/0297703 | A1* | 10/2016 | Aniolek ................ C03B 17/067 |

FOREIGN PATENT DOCUMENTS

| | | | |
|---|---|---|---|
| JP | 04753067 | B2 | 8/2011 |
| JP | 2013220950 | A | 10/2013 |

\* cited by examiner

METHOD AND APPARATUS FOR REDUCING SHEET WIDTH ATTENUATION OF SHEET GLASS

CROSS-REFERENCE TO RELATED APPLICATIONS

This application claims the benefit of priority under 35 U.S.C. § 371 of International Patent Application Ser. No. PCT/US15/53415, filed on Oct. 1, 2015, which in turn, claims the benefit of priority of U.S. Provisional Patent Application Ser. No. 62/059528 filed on Oct. 3, 2014, the contents of each of which are relied upon and incorporated herein by reference in their entireties.

FIELD OF THE DISCLOSURE

The disclosure relates to methods and systems for forming a glass sheet, and more particularly to methods and systems for forming a glass sheet by drawing sheet glass using edge rolls that can be oriented so that the rotation axis forms an angle with the horizontal.

BACKGROUND

Glass display panels are used in a variety of applications—from hand-held mobile devices to tablets to computer monitors to television displays. These applications require glass sheets which have pristine, defect-free surfaces.

One method of producing glass for optical displays is by an overflow downdraw process (also known as a fusion downdraw process). This process produces pristine surface quality compared to other processes referred to as the float and slot techniques in the literature. U.S. Pat. Nos. 3,338,696 and 3,682,609 (Dockerty), which are incorporated in their entirety herein by reference, disclose a fusion downdraw process which includes flowing a molten glass over the edges, or weirs, of a forming wedge, commonly referred to as an isopipe. See also U.S. Patent Publications Nos. 2005/0268657 and 2005/0268658, the contents of which are also incorporated herein in their entireties by reference. The molten glass flows over converging forming surfaces of the isopipe, and the separate flows reunite at the apex, or root, where the two converging forming surfaces meet, to form a glass ribbon, or sheet. Thus, the glass which has been in contact with the forming surfaces is located in the inner portion of the glass sheet, and the exterior surfaces of the glass sheet are contact-free.

The sheet as it evolves decreases in thickness under the forces of gravity and pulling equipment. In particular, pulling rolls are placed downstream of the isopipe root and to adjust the rate at which the ribbon leaves the isopipe, and thus help determine the thickness of the finished sheet. The pulling equipment is located sufficiently downstream so that the viscous glass has cooled and become rigid enough to be pulled. The contacted edge portions are later removed from the finished glass sheet. As the glass ribbon descends from the root of the isopipe, it cools to form a solid, elastic glass ribbon, which may then be cut to form smaller sheets of glass.

The glass sheet that is produced by the fusion downdraw process, however, has a narrower width than the viscous glass ribbon at the root. This loss of width is due to contraction of the glass ribbon laterally within the viscous region of the drawing process, which is also referred to as sheet width attenuation. Contraction of the ribbon laterally during the viscous phase of the drawing process is also related to an instability known as sheet width variation, which may be characterized by unstable velocity contours within the viscous glass sheet.

The loss of sheet width within the viscous region of the downdraw process also manifests itself as accumulated thickness, or beads, at the edges of the sheet. Due to the differences in both thickness and temperature between the beads and the center of the sheet, the formation of these edge beads gives rise to a multitude of issues. For example, the formation of edge beads can cause temporary stresses that produce an unstable ribbon shape during the draw process and/or permanent stresses in certain regions of the sheet upon cooling of the glass. The edge beads may also prevent an operator from bending the glass ribbon to a desired radius of curvature, such as may be necessary where the glass is prepared for use in certain applications. Thus, there is a need in the industry to address these problems.

SUMMARY

The disclosure relates, in various embodiments, apparatuses, or systems, for drawing sheet glass, such as from the root of an isopipe in a fusion downdraw process. Embodiments are also applicable to other glass forming processes such as a slot drawing process, a double fusion process, a float process, and the description of some embodiments with reference to a fusion downdraw system should not limit the scope of the claims appended herewith.

Some embodiments relate to an apparatus for drawing sheet glass comprising a first pair of edge rolls configured to contact a first edge of a viscous ribbon of glass along the front and back sides and a second pair of edge rolls configured to contact a second edge of the viscous ribbon of glass along the front and back sides. The first pair of edge rolls and the second pair of edge rolls may be aligned with each other along a first line orthogonal to movement of the ribbon of glass. And at least one of the first pair of edge rolls and the second pair of edge rolls may be oriented to provide a rotation axis that forms an angle between about 3 degrees and about 55 degrees from the first line or configured to form a non-zero angle.

A further embodiment of an apparatus for drawing sheet glass comprises a third pair of edge rolls configured to contact the first edge of a viscous ribbon of glass along the front and back sides and a fourth pair of edge rolls configured to contact the second edge of the viscous ribbon of glass along the front and back sides. The third pair of edge rolls and the fourth pair of edge rolls may be aligned with each other along a second line orthogonal to movement of the ribbon of glass. And at least one of the third pair of edge rolls and the fourth pair of edge rolls may be oriented to provide a rotation axis that forms an angle between about 3 degrees and about 55 degrees from the second line.

In some embodiments, the apparatus comprises a forming wedge having a pair of forming surface portions that converge at the bottom of the forming wedge to form a root. The system also comprises at least one set of edge rolls. The set of edge rolls comprises a pair of edge rolls configured to contact a first edge of a viscous ribbon of glass along the front and back sides (i.e. a first pair of edge rolls) and a pair of edge rolls configured to contact a second edge of the viscous ribbon of glass along the front and back sides (i.e. a second pair of edge rolls). The pairs of edge rolls are aligned with one another at a first location in the viscous region of the drawing process. At least one of the pairs of edge rolls, and preferably both pairs of edge rolls, is oriented such that the rotation axis of each edge roll is between about 3 degrees and about 55 degrees.

A further embodiment of an apparatus for drawing sheet glass comprises at least one additional set of edge rolls that is located at a second vertical location in the viscous region of the drawing process. The additional set of edge rolls comprises a pair of edge rolls configured to contact the first edge of a viscous ribbon of glass along the front and back sides (i.e. a third pair of edge rolls) and a pair of edge rolls configured to contact the second edge of the viscous ribbon of glass along the front and back sides (i.e. a fourth pair of edge rolls). The pairs of edge rolls are aligned with one another at a second location in the viscous region of the drawing process, the second vertical location being different from the vertical location of the first set of edge rolls. At least one of the pairs of edge rolls, and preferably both pairs of edge rolls, is oriented such that the rotation axis of each edge roll is between about 3 degrees and about 55 degrees.

The disclosure also relates, in various embodiments, to methods for reducing sheet width attenuation and/or sheet width variation of a drawn sheet glass.

Some embodiments relate to a method for reducing sheet width attenuation of a drawing sheet glass by passing a viscous ribbon of glass through a first pair of edge rolls configured to contact a first edge of a viscous ribbon of glass along the front and back sides, and a second pair of edge rolls configured to contact a second edge of the viscous ribbon of glass along the front and back sides. The first pair of edge rolls and the second pair of edge rolls may be aligned with each other along a first line orthogonal to movement of the ribbon of glass. And at least one of the first pair of edge rolls and the second pair of edge rolls may be oriented to provide a rotation axis that forms an angle between about 3 degrees and about 55 degrees from the first line.

A further embodiment of a method for reducing sheet width attenuation of a drawing sheet glass comprises passing a viscous ribbon of glass through a third pair of edge rolls configured to contact the first edge of the viscous ribbon of glass along the front and back sides, and a fourth pair of edge rolls configured to contact the second edge of the viscous ribbon of glass along the front and back sides. The third pair of edge rolls and the fourth pair of edge rolls may be aligned with each other along a second line orthogonal to movement of the ribbon of glass. And the third pair of edge rolls and the fourth pair of edge rolls may be oriented to provide a rotation axis that forms an angle between about 3 degrees and about 55 degrees from the second line.

In some embodiments, the method comprises passing a viscous ribbon of fusion drawn glass through a pair of edge rolls configured to contact a first edge of a viscous ribbon of glass along the front and back sides (i.e. a first pair of edge rolls) and a pair of edge rolls configured to contact a second edge of the viscous ribbon of glass along the front and back sides (i.e. a second pair of edge rolls). The pairs of edge rolls are aligned with one another at a first location in the viscous region of the drawing process. At least one of the pairs of edge rolls, and preferably both pairs of edge rolls, is oriented such that the rotation axis of each edge roll is between about 3 degrees and about 55 degrees.

A further embodiment of a method for reducing sheet width attenuation and/or sheet width variation of a fusion drawn glass sheet comprises passing the viscous ribbon of glass through at least one additional set of edge rolls that is located at a second vertical location in the viscous region of the drawing process. The additional set of edge rolls comprises a pair of edge rolls configured to contact the first edge of a viscous ribbon of glass along the front and back sides (i.e. a third pair of edge rolls) and a pair of edge rolls configured to contact the second edge of the viscous ribbon of glass along the front and back sides (i.e. a fourth pair of edge rolls). The pairs of edge rolls are y aligned with one another at a second location in the viscous region of the drawing process, the second location being different from the location of the first set of edge rolls. At least one of the pairs of edge rolls, and preferably both pairs of edge rolls, is oriented such that the rotation axis of each edge roll is between about 3 degrees and about 55 degrees.

Using embodiments of the systems and methods described herein, it has unexpectedly been found that one may produce a glass sheet having a width that approaches or is the same as the width of the viscous glass ribbon exiting the root. In some fusion drawn embodiments, the glass sheet may even have a greater width than the viscous glass ribbon exiting the root.

Using embodiments of the systems and methods described herein, one may also produce a glass sheet having a reduced ratio of bead thickness to center thickness. By limiting the differences in thickness and temperature between the beads and the center of the sheet, glass sheets having improved stability and performance characteristics may be produced.

It has also unexpectedly been found that, using embodiments of the systems and methods described herein, one may mitigate sheet width variation by creating substantially parallel velocity contours at the edges of the drawn glass ribbon.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Figure 1:
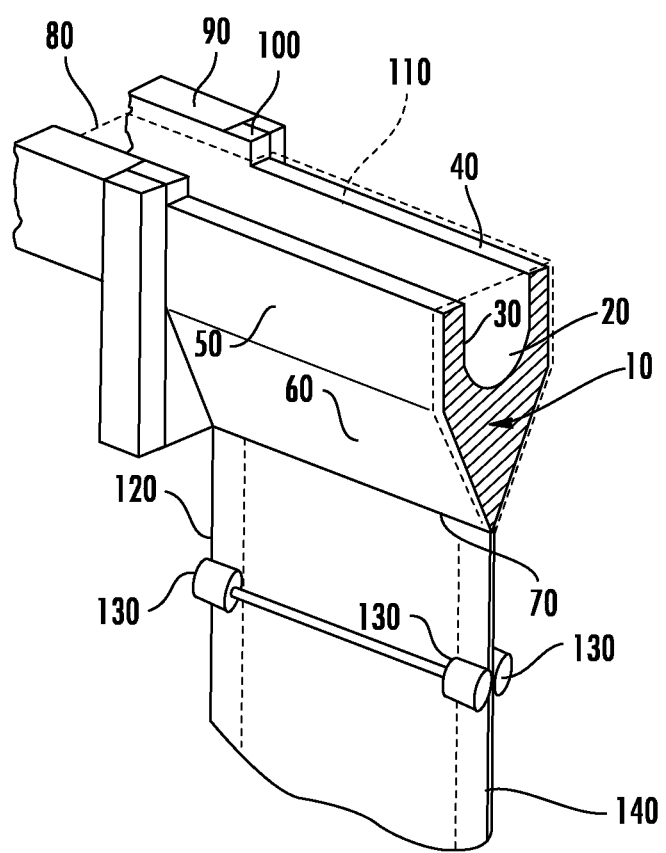
FIG. 1 is a perspective, partial cross sectional view of a fusion downdraw apparatus.

Reference will now be made in detail to the present embodiments, examples of which is/are illustrated in the accompanying drawings. Whenever possible, the same reference numerals will be used throughout the drawings to refer to the same or like parts.

As used herein, a downdraw glass sheet manufacturing process refers to any form of glass sheet manufacturing processes in which glass sheets are formed while viscous glass is drawn in a downward direction. In a fusion downdraw forming process, molten glass flows into a trough, then overflows and runs down both sides of a pipe, fusing together at what is known as the root, and is drawn downward until cool. An exemplary overflow glass sheet manufacturing process can be described with the help of FIG. 1, wherein an overflow trough member or forming wedge 10 includes an upwardly open channel 20 bounded on its longitudinal sides by wall portions 30, which terminate at their upper extent in opposed longitudinally-extending overflow lips or weirs 40. It should be noted, however, that while reference will be made to a downdraw fusion glass sheet manufacturing process herein, the claims appended herewith should not be so limited as exemplary embodiments are applicable in float glass processes, slot draw processes and other glass sheet manufacturing processes. The weirs 40 communicate with opposed outer sheet forming surfaces of the forming wedge 10. As shown, the forming wedge 10 can be provided with a pair of substantially vertical forming surface portions 50 communicating with the weirs 40, and a pair of inclined converging surface portions 60 which terminate at a substantially horizontal lower apex or root 70 forming a straight glass draw line.

Molten glass 80 may be fed into the channel 20 by means of a delivery passage 90. The feed into the channel 20 may be single ended or, if desired, double ended. A pair of restricting dams 100 may be provided above the overflow weirs 40 adjacent each end of the channel 20 to direct the overflow of the free surface 110 of molten glass 80 over the overflow weirs 40 as separate streams, and down opposed forming surface portions 50, 60 to the root 70 where the separate streams, shown in chain lines, converge to form a sheet of pristine-surfaced glass 120.

In the fusion process, pulling rolls 130 may be placed downstream of the root 70 of the forming wedge 10 and may be used to adjust the rate at which the formed ribbon of glass leaves the converging forming surfaces and thus help determine the nominal thickness of the finished sheet. Suitable pulling rolls are described, for example, in U.S. Pat. No. 6,896,646, the content of which is incorporated in its entirety herein by reference.

The pulling rolls may be designed to contact the glass ribbon at its outer edges, specifically, in regions just inboard of the thickened beads which exist at the very edges of the ribbon. The glass edge portions 140, which are contacted by the pulling rolls, may be later discarded from the substrates after they are separated from the sheet.

In the drawing apparatus shown in FIG. 1, as a glass sheet (glass ribbon) travels down the drawing portion of the apparatus, the sheet experiences intricate structural changes, not only in physical dimensions but also on a molecular level. The change from a supple but thick liquid form at, for example, the root of the forming wedge, to a stiff glass sheet having a desired thickness may be achieved by a carefully chosen temperature field that delicately balances the mechanical and chemical requirements to complete the transformation from a liquid, or viscous, state to a solid, or elastic, state.

One advantage to the fusion forming process described above is that the glass sheet can be formed without the glass surface contacting any refractory forming surfaces. This provides for a smooth, contaminant-free surface. In addition, this technique may be capable of forming flat, thin sheets within high tolerances. However, other sheet forming techniques may also benefit from the present disclosure, including, but not limited to, the slot draw and redraw forming techniques. In the slot draw technique, molten glass flows into a trough having a machined slot in the bottom. The sheets of glass may be pulled down through the slot. The quality of the glass may be dependent, among other things, on the accuracy of the machined slot. Redraw processes generally involve pre-forming a glass composition into a block, then reheating and drawing the glass into a thinner sheet product.

Figure 2:
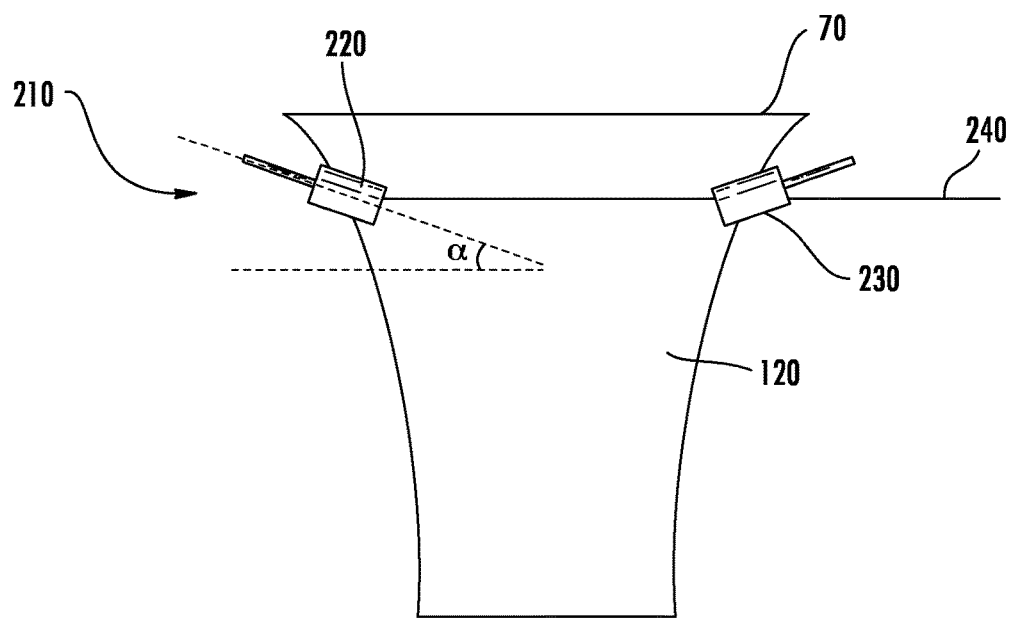
FIG. 2 is a side elevation view of an embodiment of a system for drawing sheet glass comprising a set of edge rolls.

Some embodiments of the system and method described herein can improve on the drawing apparatus shown in FIG. 1 by providing one or more sets of edge rolls 210 that may be configured to contact the edges of the glass ribbon while the glass ribbon may be in the viscous region of the drawing process. Of course, embodiments described herein are applicable to other glass forming processes such as a slot drawing process, a double fusion process, a float process, and the description of some embodiments with reference to the depicted drawing process should not limit the scope of the claims appended herewith. As shown in FIG. 2, at least one of the one or more sets of edge rolls may be oriented to provide a rotation axis that forms an angle $\alpha$ from horizontal in a fusion drawing process or from a line orthogonal to the direction of travel and parallel to a plane formed by the sheet of glass.

As used herein, each set of edge rolls 210 comprises a pair of edge rolls 220 configured to contact the first outer edge of the viscous ribbon of glass along both the front and back sides, or a first pair of edge rolls. The first pair of edge rolls 220 comprises an edge roll for contacting the front side of the glass ribbon and an edge roll for contacting the back side of the glass ribbon Each set of edge rolls 210 can also comprise a pair of edge rolls 230 configured to contact the second, or opposite, outer edge of the viscous ribbon of glass along both the front and back sides, or a second pair of edge rolls. The second pair of edge rolls 230 comprises an edge roll for contacting the front side of the glass ribbon and an edge roll for contacting the back side of the glass ribbon.

In some embodiments, any one the first pair of edge rolls 220 or the second pair of edge rolls 230 may be oriented to provide a rotation axis that forms an angle $\alpha$ from horizontal in a fusion drawing process or from a line orthogonal to the direction of travel and parallel to a plane formed by the sheet of glass. In other embodiments, both the first pair of edge rolls 220 and the second pair of edge rolls 230 may be oriented to provide a rotation axis that forms an angle from horizontal in a fusion drawing process or from a line orthogonal to the direction of travel and parallel to a plane formed by the sheet of glass. In further embodiments, neither the first or second pairs of edge rolls 220, 230 are oriented to provide a rotation axis forming such an angle. In other embodiments, both the first pair of edge rolls 220 and the second pair of edge rolls 230 may be oriented such that the angles a formed by each are substantially the same.

In some embodiments, the angle $\alpha$ may be between about 0 degrees and about 55 degrees, between about 0 degrees and about 45 degrees, between about 0 degrees and about 40 degrees, between about 0 degrees and about 35 degrees, between about 0 degrees and about 30 degrees, between about 0 degrees and about 25 degrees, between about 0 degrees and about 15 degrees, and all sub-ranges therebetween. Alternatively, in some embodiments, the angle $\alpha$ may be between about 3-7 degrees and about 55 degrees, between about 3-7 degrees and about 45 degrees, between about 3-7 degrees and about 40 degrees, between about 3-7 degrees and about 35 degrees, between about 3-7 degrees and about 30 degrees, between about 3-7 degrees and about 25 degrees, between about 5-7 degrees and about 15 degrees, and all sub-ranges therebetween.

The first pair of edge rolls 220 and the second pair of edge rolls 230 may be vertically aligned at a first position below the root 240 in a fusion drawing process or aligned with each other along the direction of travel of the sheet of glass. The position 240 may be based on a line extending horizontally between the center of the inward end of the first pair of edge rolls 220 and the center of the inward end of the second pair of edge rolls 230 in the exemplary fusion drawing embodiments or may be based on a line extending orthogonally to the direction of travel and parallel to a plane formed by the sheet of glass. The position 240 may be within the region within which the glass ribbon is in a viscous state.

In some embodiments, the vertical position 240 may be located close to the root 70. As used herein, the root 70 refers to the location where the separate glass streams converge to form a sheet of pristine-surfaced glass 120 in a fusion drawn embodiment. Thus, in embodiments that comprise an edge director projection extending below the bottom of the inclined converging surface portions 60, such as the sort described in U.S. 3,537,834, the entirety of which is incorporated herein by reference, the root 70 may be considered to be the tip of the edge director projection where the separate streams of glass converge.

In some embodiments, for example, the vertical or horizontal position 240 may be between about 3 cm and about 30 cm below the root 70. Alternatively, the vertical or horizontal position 240 may be between about 3 cm and about 25 cm below the root 70, between about 3 cm and about 20 cm below the root, between about 3 cm and about 18 cm below the root, between about 3 cm and about 16 cm below the root, between about 3 cm and about 14 cm below the root, between about 3 cm and about 12 cm below the root, between about 3 cm and about 10 cm below the root, and all sub-ranges therebetween.

The placement of a set of edge rolls 210 close to the root 70 may be particularly advantageous in preventing or minimizing sheet width variation as lateral contraction of the ribbon edge immediately below the root 70 is believed to be a primary factor in causing sheet width variation. Thus, by locating a set of edge rolls 210 close to the root 70, sheet width variation may be minimized or prevented altogether. Accordingly, in some embodiments, the vertical or horizontal position 240 may be less than 25 cm below the root 70, less than 20 cm below the root, less than 18 cm below the root, less than 16 cm below the root, less than 14 cm below the root, less than 14 cm below the root, less than 12 cm below the root, less than 10 cm below the root, and all sub-ranges therebetween.

Figure 3:
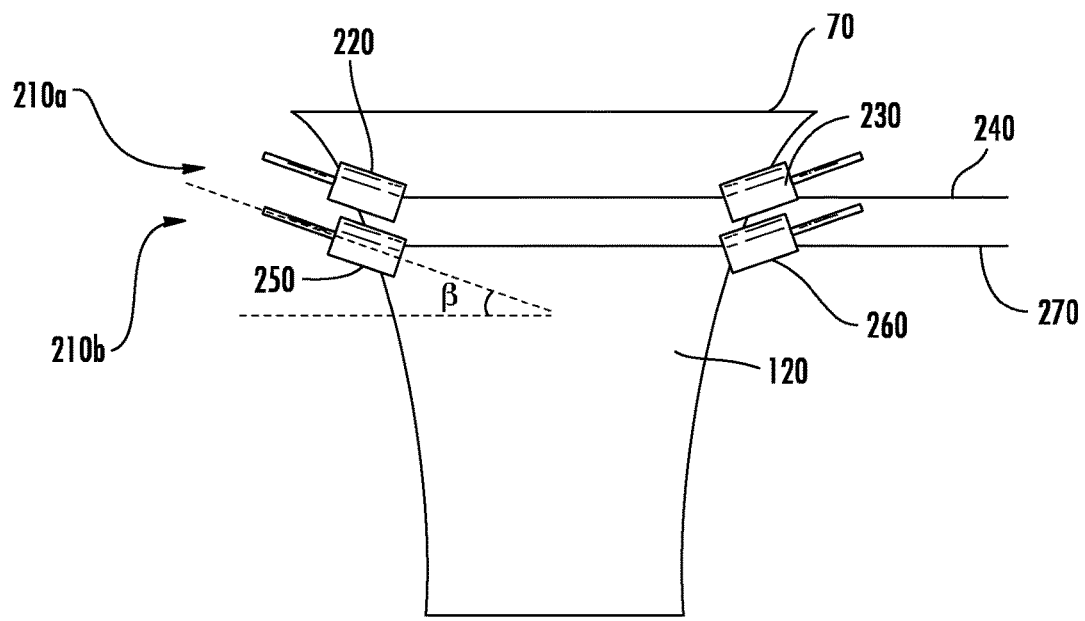
FIG. 3 is a side elevation view of an embodiment of a system for drawing sheet glass comprising a first set of edge rolls and a second set of edge rolls.

In some embodiments, more than one set of edge rolls 210 may be provided. For example, as shown in FIG. 3, a first set of edge rolls 210a and a second set of edge rolls 210b may be provided. Although not illustrated, it is contemplated that one may provide any number of additional sets of edge rolls in embodiments of the system and method described herein. For instance, embodiments may comprise three sets of edge rolls, four sets of edge rolls, etc.

As with the first set of edge rolls 210a, the second set of edge rolls 210b comprises a pair of edge rolls 250 configured to contact the first outer edge of the viscous ribbon of glass along both the front and back sides, or a third pair of edge rolls. The third pair of edge rolls 250 comprises an edge roll for contacting the front side of the glass ribbon and an edge roll for contacting the back side of the glass ribbon.

The second set of edge rolls 210b also comprises a pair of edge rolls 260 configured to contact the second, or opposite, outer edge of the viscous ribbon of glass along both the front and back sides, or a fourth pair of edge rolls. The fourth pair of edge rolls 260 comprises an edge roll for contacting the front side of the glass ribbon and an edge roll for contacting the back side of the glass ribbon.

Any one of the third pair of edge rolls 250 and/or the fourth pair of edge rolls 260 may be oriented to provide a rotation axis that forms an angle β from horizontal in a fusion drawing process or from a line orthogonal to the direction of travel and parallel to a plane formed by the sheet of glass. In some embodiments both of the third pair of edge rolls 250 and the fourth pair of edge rolls 260 may be oriented to provide a rotation axis that forms an angle from horizontal in a fusion drawing process or from a line orthogonal to the direction of travel and parallel to a plane formed by the sheet of glass. In other embodiments neither of the third and fourth pairs of edge rolls 250, 260 are oriented in such a manner. In further embodiments, both of the third pair of edge rolls 250 and the fourth pair of edge rolls 260 are oriented such that the angles β formed by each are substantially the same.

In some embodiments, the angle β may be between about 0 degrees and about 55 degrees, between about 0 degrees and about 45 degrees, between about 0 degrees and about 40 degrees, between about 0 degrees and about 35 degrees, between about 0 degrees and about 30 degrees, between about 0 degrees and about 25 degrees, between about 0 degrees and about 15 degrees, and all sub-ranges therebetween. In other embodiments, the angle β may be between about 3-7 degrees and about 55 degrees, between about 3-7 degrees and about 45 degrees, between about 3-7 degrees and about 40 degrees, between about 3-7 degrees and about 35 degrees, between about 3-7 degrees and about 30 degrees, between about 3-7 degrees and about 25 degrees, between about 3-7 degrees and about 15 degrees, and all sub-ranges therebetween. Alternatively, in further embodiments, the angle β may be between about 15 degrees and about 55 degrees, between about 15 degrees and about 45 degrees, between about 15 degrees and about 40 degrees, between about 15 degrees and about 35 degrees, between about 15 degrees and about 30 degrees, between about 15 degrees and about 25 degrees, and all sub-ranges therebetween.

In some embodiments, the angle β at which the second set of edge rolls 210b may be oriented is different from the angle α at which the first set of edge rolls 210a may be oriented. For example, it may be desirable to configure the second set of edge rolls 210b to form an angle β which may be greater than the angle α. In some embodiments, for example, the first set of edge rolls 210a may be oriented to form an angle between about 3 degrees and about 20 degrees and the second set of edge rolls 210b may be oriented to form an angle between about 15 degrees and about 40 degrees. Alternatively, the first set of edge rolls 210a may be oriented to form an angle between about 3 degrees and about 12 degrees and the second set of edge rolls 210b may be oriented to form an angle between about 15 degrees and about 30 degrees. Of course, these embodiments are exemplary only and should not limit the scope of the claims appended herewith.

The third pair of edge rolls 250 and the fourth pair of edge rolls 260 may be vertically aligned at a second position 270 in a fusion drawing process or aligned with each other along the direction of travel of the sheet of glass. The location of the second position 270 may be based on a line extending horizontally between the center of the inward end of the third pair of edge rolls 250 and the center of the inward end of the fourth pair of edge rolls 260 in the exemplary fusion drawing embodiments or may be based on a line extending orthogonally to the direction of travel and parallel to a plane formed by the sheet of glass. The location of the second position 270 may be within the region within which the glass ribbon is in a viscous state, but below the first position 240.

In some embodiments, the second position 270 may be between about 12 cm and about 50 cm below the root 70, between about 15 cm and about 50 cm below the root 70, between about 15 cm and about 45 cm below the root, between about 15 cm and about 40 cm, between about 15 cm and about 30 cm, between about 20 cm and about 45 cm below the root, between about 20 cm and about 40 cm below the root, between about 30 cm and about 45 cm below the root, between about 30 cm and about 50 cm below the root, and all sub-ranges therebetween.

In some embodiments, the second position 270 may be less than 24 cm below the first position 240, less than 22 cm below the first position, less than 20 cm below the first position, less than 18 cm below the first position, less than 16 cm below the first position, etc.

Each set of edge rolls 210 may independently be configured to run in either constant rotation speed mode or constant torque mode. For example, when sheet width variation/instability occurs, torque of edge rolls running in a constant-velocity mode can vary in a consistent manner with sheet width variation in terms of oscillation pattern and periods. Thus, a constant-torque mode can be used to maintain the tension applied by the edge rolls in a controllable manner, and in some embodiments, it may be desirable to have the first set of edge rolls 210a run in a constant torque mode and to have the second set of edge rolls 210b run in a constant speed mode.

Each set of edge rolls 210 may independently be configured to comprise a substantially smooth contact surface or a knurled contact surface. Knurls on exemplary edge rolls can be used to grip glass sheets and avoid slipping (as well as provide additional cooling). It was noted by Applicant, however, that when more than one set of edge rolls are used, concerns arise that when both sets of edge rolls have knurled patterns, gripping the glass sheet can become difficult for the second set of edge rolls. Thus, in some embodiments, it may be desirable to provide one of the first set of edge rolls 210a and the second set of edge rolls 210b with a knurled surface and the other of the first set of edge rolls and the second set of edge rolls with a substantially smooth surface.

By selecting the degree of incline and the position of the one or more sets of edge rolls 210, the sheet width attenuation of a drawn sheet glass may be reduced. Reducing sheet width attenuation of a drawn sheet glass can be performed in situations where the amount of lateral contraction of the glass ribbon has been mitigated such that the width of the resulting sheet glass is greater than it would have been using either conventionally oriented or no edge rolls. However, as used herein, reducing sheet width attenuation of a drawn sheet glass can also be performed in situations where (a) lateral contraction of the glass ribbon may be prevented altogether, such that the width of the resulting sheet glass is substantially the same as the width of the glass ribbon at the root (i.e. where there has been zero sheet width attenuation) and (b) where the sheet is stretched, such that the width of the resulting sheet glass is greater than the width of the glass ribbon at the root.

By selecting the degree of incline and the position of the one or more sets of edge rolls 210, sheet glass having a width that at least about 90% of the width of the viscous glass ribbon at the root may be produced. Alternatively, sheet glass having a width that is at least about 92% of the width of the viscous glass ribbon at the root, at least about 94% of the width of the viscous glass ribbon at the root, at least about 95% of the width of the viscous glass ribbon at the root, at least about 96% of the width of the viscous glass ribbon at the root, at least about 97% of the width of the viscous glass ribbon at the root, at least about 98% of the width of the viscous glass ribbon at the root, at least about 99% of the width of the viscous glass ribbon at the root, or the same width as the viscous glass ribbon at the root may be produced, thus effectively preventing sheet width attenuation.

In some embodiments, by selecting the degree of incline and the position of the one or more sets of edge rolls 210, sheet glass having a width that is greater than the width of the viscous glass ribbon at the root may be produced. In addition to effectively preventing sheet width attenuation, the sheet width may be stretched by control of the degree of incline and position of the one or more set of edge rolls 210. For example, sheet glass having a width that is at least about 100% of the width of the viscous glass ribbon at the root, at least about 102%, at least about 104%, or at least about 105% of the width of the viscous glass ribbon at the root may be produced.

Additionally, by selecting the degree of incline and the position of the one or more sets of edge rolls 210, thickness of the beads that are known to form along the edges of the glass sheet may be reduced. As described previously, a number of problems with sheet stability may result from an increased thickness of the edge beads and any slower cooling that the increased thickness gives rise to. Accordingly, reducing the thickness of the edge beads can produce increased ribbon and glass sheet stability.

In some embodiments, the ratio between the thickness of the bead and the thickness of the sheet center can be used as an indication as to the degree to which the bead thickness has been reduced. Using embodiments of the disclosure described herein, a selection of the degree of incline and the position of the one or more sets of edge rolls 210, glass sheets may be produced having a ratio of bead thickness to center thickness less than 12:1. Alternatively, glass sheets may be produced having a ratio of bead thickness to center thickness less than 10:1, less than 8:1, less than 6:1, less than 5:1, less than 4:1, less than 3:1, less than 2.5:1, less than 2:1, less than 1.5:1, and all sub-ranges therebetween.

Sheet width variation can also be reduced through selection of the degree of incline and the position of the one or more sets of edge rolls 210 as well as the relative distances between different sets of edge rolls and the relative speed of the different sets of edge rolls. For example, as described previously, it may often be desirable to place at least one set of edge rolls 210 close to the root to prevent any attenuation occurring immediately beyond the root and may be a key driver of sheet width variation. In another example, first set of edge roll speed can be scaled to the root condition instead of to the pulling speed to avoid excessive tension to the glass near the root which may lead to flow separation for glass flow on edge directors particularly when forming ultrathin glass (e.g., <200 microns, <100 microns, etc.). The second set of edge rolls can also be used to decouple any impact of pulling rolls to the first set of edge rolls.

As used herein, reduction of sheet width variation can include those embodiments where sheet width variation is effectively eliminated. In some embodiments, sheet width variation can be measured for example by cameras installed typically at the bottom of the draw to record the location of the very outer edge of the sheet. Sheet width variation can also be indicated by tracking the vertical velocities of the viscous glass at various points within the drawing glass ribbon. This can be achieved, for example, by plotting the vertical velocity at various points to obtain vertical velocity contours across the width, or a portion of the width, of the glass ribbon in the viscous region. Of course, these plots showing vertical velocity are analogous to horizontal velocity in embodiments (float processes) having a horizontal direction of travel. Where vertical velocity contours are continuously increasing in a generally parallel manner across the width of the glass ribbon, sheet width variation can be reduced or avoided.

By selecting the degree of incline and the position of the one or more sets of edge rolls 210, generally parallel vertical velocity contours within the viscous region of the drawing process can be obtained. These contours indicate a substantially smooth and continuous glass velocity increase in the direction. Accordingly, by selecting the degree of incline and the vertical position of the one or more sets of edge rolls 210, sheet width variation may be reduced or eliminated.

It has also been found that even without an angling of the edge rolls, the addition of a second set of edge rolls 210b a short distance below the first set of edge rolls 210a can itself be beneficial in reducing sheet width attenuation, sheet width variation, and edge beading. Accordingly, in some embodiments, any of the first set of edge rolls 210a and the second set of edge rolls 210b may be oriented such that the rotation axis is horizontal in a fusion drawing process or on a line orthogonal to the direction of travel and parallel to a plane formed by the sheet of glass. The second set of edge rolls 210b may be positioned before the final sheet width and/or thickness is settled in order to generate an effective cross-draw tension.

EXAMPLES

Various embodiments will be further clarified by the following examples.

To evaluate the capability for edge rolls having a selected degree of incline and position to reduce sheet width attenuation, reduce bead thickness, and/or reduce vertical velocity inconsistencies associated with sheet width variation, several experiments were performed. Using principles of fluid flow and the principles of heat transfer, the flow of the glass ribbon during a drawing process was performed. Edge rolls were then placed at prescribed locations below the root line and given a prescribed degree of incline. After insertion of the edge rolls, sheet edge position, sheet thickness, and velocity and temperature fields at a variety of points between the start of the root line and a certain distance below the root line were determined.

Example 1

The effects of placing a single set of edge rolls 210 having varying degrees of incline at a position located below the root line was determined. Edge rolls 210 were oriented such that the rotation axis formed angles of 10 degrees from horizontal, 20 degrees from horizontal, 30 degrees from horizontal, 40 degrees from horizontal, and 50 degrees from horizontal.

Additionally, the effects of positioning a set of edge rolls with regard to sheet size were determined and are provided in Table 1 below using angles of −50, −10, 10, 20, 30, 40 and 50 degrees.

TABLE 1

| Tilt Angle | Sheet size (m) | Change in sheet size relative to root line width (mm) | % change |
| --- | --- | --- | --- |
| −50 | 2.35 | −593 | −20.1 |
| −10 | 2.62 | −327 | −11.1 |
| 10 | 2.74 | −206 | −7.0 |
| 20 | 2.80 | −150 | −5.1 |
| 30 | 2.86 | −90 | −3.1 |
| 40 | 2.92 | −25 | −0.8 |
| 50 | 2.99 | 46 | 1.6 |

Figure 4:
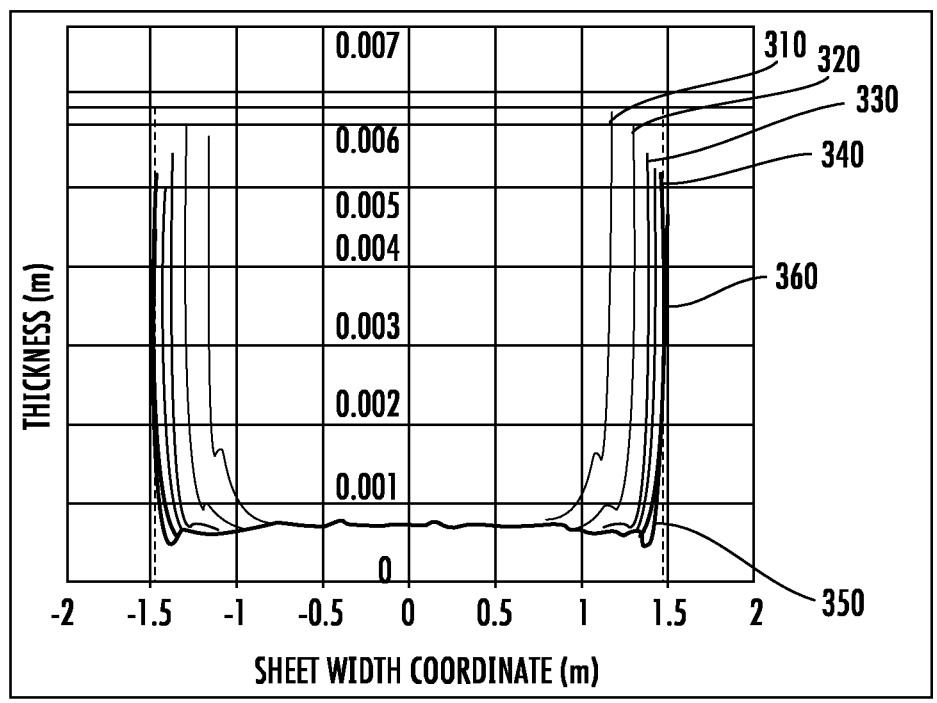
FIGS. 4 and 5 are graphical representations of experimental data for some embodiments.

These tabular results are also illustrated graphically in FIG. 4. FIG. 4 illustrates the resulting sheet widths obtained when using each set of edge rolls as well as the thickness profile across the width of the sheet when using each set of edge rolls. The dashed lines on the left and right sides indicate the edges of glass ribbon at the root line.

Reference point 310 is representative of the edge roll having a rotation axis that forms an angle −50 degrees from horizontal. Reference point 320 is representative of the edge roll having a rotation axis that forms an angle −10 degrees from horizontal, reference point 330 is representative of the edge roll having a rotation axis that forms an angle 20 degrees from horizontal, and reference point 340 is representative of the edge roll having a rotation axis that forms an angle 30 degrees from horizontal. With continued reference to FIG. 4, reference point 350 is representative of the edge roll having a rotation axis that forms an angle 40 degrees from horizontal, and reference point 360 is representative of the edge roll having a rotation axis that forms an angle 50 degrees from horizontal.

As seen in FIG. 4, as the tilt angle of the edge roll was increased, the sheet width increased. Also of note may be the fact that point 350 overlies the dashed lines at each side of FIG. 4 and point 360 extends beyond the dashed lines at each side of FIG. 4. When the edge roll was tilted to an angle 40 degrees from horizontal, the sheet width coincided with the width of the starting ribbon, and when the edge roll was tilted to an angle 50 degrees from horizontal, the sheet width became wider than the starting ribbon. Additionally, it was found that as the sheet width increased, the thickness of the bead at each edge decreased.

Example 2

The effects of using multiple sets of edge rolls 210 having varying degrees of incline was also determined. In several experiments a first set of edge rolls 210a was placed at a position located below the root line and a second set of edge rolls was placed at a position located below the root line. Each set of edge rolls 210a, 210b were oriented such that the rotation axis of both sets 210a, 210b formed angles of 10 degrees from horizontal, 20 degrees from horizontal, 30 degrees from horizontal, 40 degrees from horizontal, and 50 degrees from horizontal with Table 2 providing tabular results of resulting sheet widths when carrying tilt angles of the set of edge rolls.

TABLE 2

| Tilt Angle | Sheet size (m) | Change in sheet size relative to root line width (mm) | % change |
|---|---|---|---|
| 10 | 2.78 | −163 | −5.5 |
| 20 | 2.87 | −76 | −2.6 |
| 30 | 2.97 | 23 | 0.8 |
| 40 | 3.08 | 134 | 4.5 |
| 50 | 3.19 | 244 | 8.3 |

As indicated in Table 2, the results generally reflect that using higher tilt angles can provide an increase in sheet width over the width of the root.

Example 3

Figure 5:
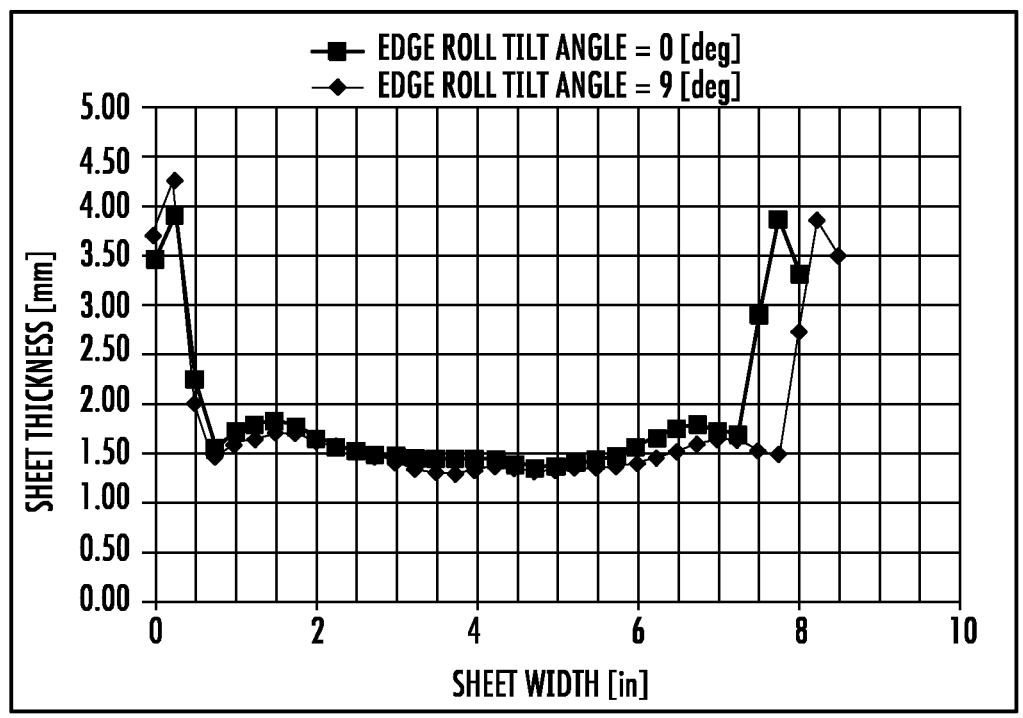

In additional experimentation, a fusion machine was fitted with a single set of edge rolls 210. In a first run, the edge rolls 210 were oriented horizontally, i.e., having a rotation axis forming an angle 0 degrees from horizontal. In a second run, the edge rolls 210 were tilted to provide a rotation axis forming an angle about 9 degrees from horizontal. FIG. 5 is a graphical representation of these experiments showing that the width of the sheet produced using an edge roll tilt angle of about 9 degrees was about 13 mm greater than the width of the sheet produced using a conventional edge roll.

This experiment can be used to provide an expected result of the differences between a small fusion platform and a commercial fusion platform. It should be noted that the amount of contact between the edge rolls of the experimental platform was much less than that which would be attained in a commercial setting and, the amount of stretching of the glass sheet, i.e., the reduction in thickness of the sheet may be significantly less than the amount that would be obtained in a commercial setting. Despite these known factors, tilting of the edge roll to an angle of about 9 degrees was demonstrated to produce a significant width increase in the glass sheet.

Example 4

Effects of edge roll position and orientation on the vertical velocity profile, and on sheet width attenuation were also determined. In a first run, experiments were performed to evaluate the effects of placing a single set of edge rolls 210 at a location about 16.5 cm below the root line. The edge rolls 210 were oriented such that the rotation axis formed an angle about 20 degrees from horizontal.

Figure 6:
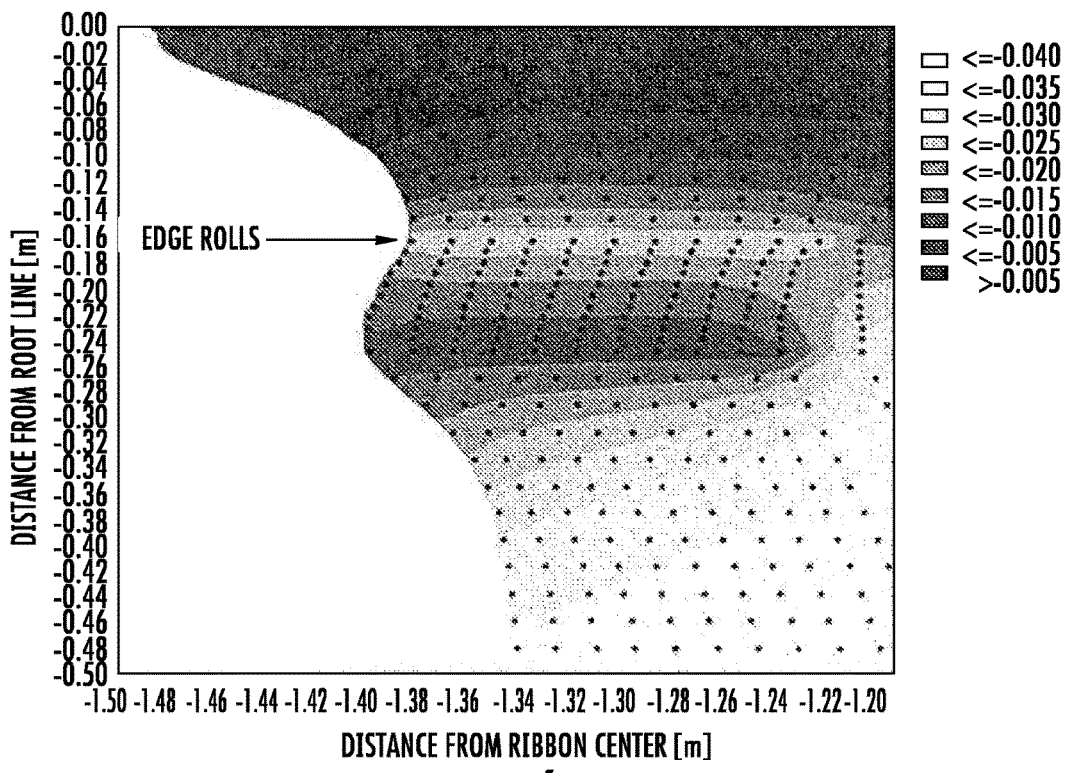
FIGS. 6-8 are contour plots of vertical velocity for further embodiments.

FIG. 6 is a two-dimensional representation of the physical movement at an edge portion of the drawn sheet glass. The top boundary represents the root line. The bottom boundary was selected to be about 50 cm below the root line. Because the final width of the glass sheet may be substantially set by the 50 cm mark, the final width of the glass sheet can be approximated by the width of the sheet at the 50 cm mark. The vertical location of the edge rolls, i.e., the distance from the root line, is indicated in FIG. 6 by an arrow. The vertical velocity at multiple positions (represented by a black dot) was determined and provided with a representative degree of shading. The shades represent the velocity on a scale from a slower velocity, which is represented by darker shading, to a faster velocity, which is represented by lighter shading.

The results plotted in FIG. 6 indicate a final sheet width of about 2.68 m (2×1.34 m). Because the width of the sheet at the root line was about 2.94 m (2×1.47 m), the width of the resulting glass sheet was about 91% of the root width. However, the results in FIG. 6 also indicate a region immediately below the edge roll where the glass vertical velocity decreases in a downward direction. This temporary decrease creates vertical velocity contours that may be uneven across the width of the glass sheet. Accordingly, some degree of sheet width variation instability may be present.

Example 5

Figure 7:
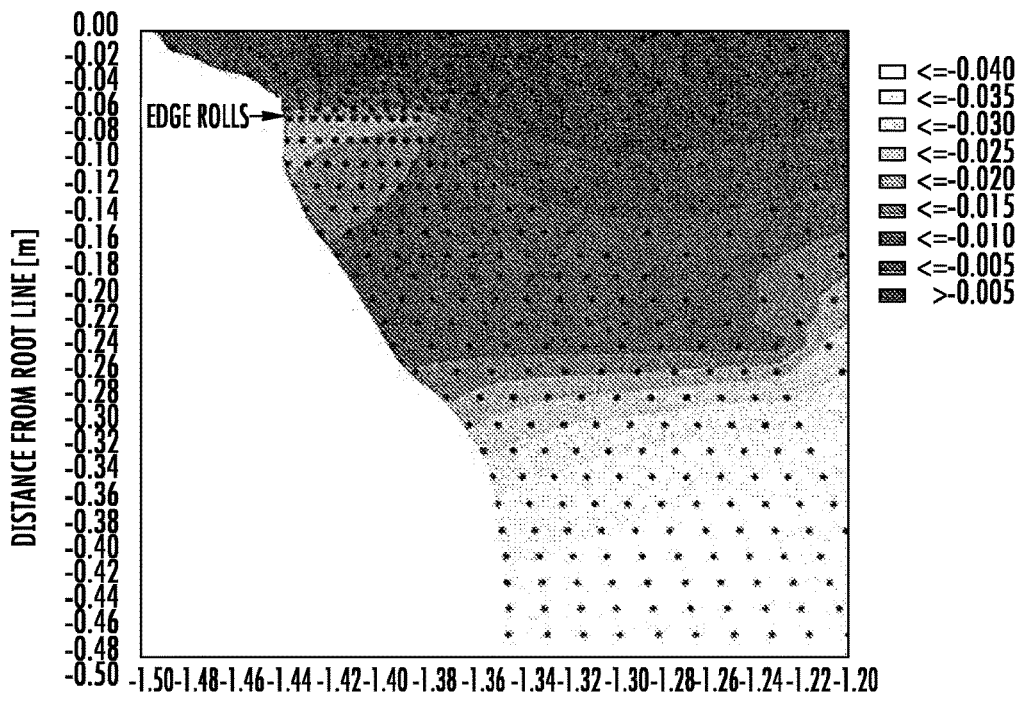

In another experiments the effects of placing a single set of edge rolls 210 at a location about 7 cm below the root line was determined. The edge rolls 210 were oriented such that the rotation axis formed an angle about 5 degrees from horizontal with the results graphically shown in FIG. 7. With reference to FIG. 7, a final sheet width of about 2.66 m is indicated representing about 90% of the root width. However, while the final sheet width may be slightly less than that obtained in Example 4, the vertical velocity contours are indicative of an improved vertical velocity profile. As in Example 4, the results indicate a region immediately below the edge roll where the glass vertical velocity decreases in a downward direction. However, while this decrease also creates vertical velocity contours that may be initially uneven across the width of the glass sheet, the contours were found to flatten out. Thus, while some degree of sheet width variation might still be present, it was significantly less than that of Example 4.

Example 6

Figure 8:
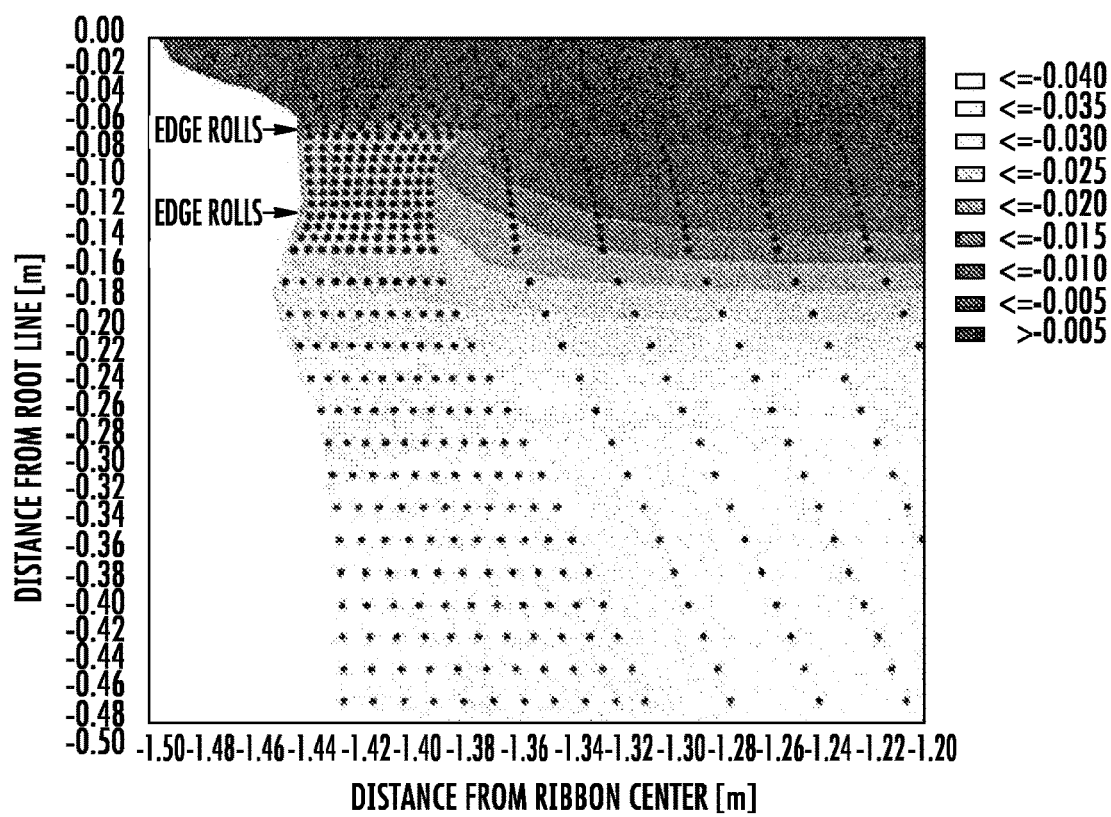

In another experiment, the effects of placing multiple sets of edge rolls 210 were determined. Accordingly, a first set of edge rolls 210a was placed at a location about 7 cm below the root line and oriented such that the rotation axis formed an angle about 5 degrees from horizontal. A second set of edge rolls 210b was placed at a location about 15 cm below the root line and oriented such that the rotation axis formed an angle about 20 degrees from horizontal with the results graphically shown in FIG. 8. With reference to FIG. 8, a final sheet width of about 2.82 m is indicated which represents about 96% of the root width. Additionally, the vertical velocity contours show a consistent velocity increase in a substantially parallel manner across the width of the glass ribbon. Accordingly, the sheet glass prepared using this embodiment can expected to be substantially free from sheet width variation.

The results of these Examples are indicative of the improvements in sheet width, thickness profile, and stability that may be obtained by positioning and orientation of edge rolls in accordance with embodiments of the present disclosure.

It will be appreciated that the various disclosed embodiments may involve particular features, elements or steps that are described in connection with that particular embodiment. It will also be appreciated that a particular feature, element or step, although described in relation to one particular embodiment, may be interchanged or combined with alternate embodiments in various non-illustrated combinations or permutations.

It is also to be understood that, as used herein the terms "the," "a," or "an," mean "at least one," and should not be limited to "only one" unless explicitly indicated to the contrary. Likewise, a "plurality" is intended to denote "more than one."

Ranges can be expressed herein as from "about" one particular value, and/or to "about" another particular value. When such a range is expressed, examples include from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

The terms "substantial," "substantially," and variations thereof as used herein are intended to note that a described feature is equal or approximately equal to a value or description.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

While various features, elements or steps of particular embodiments may be disclosed using the transitional phrase "comprising," it is to be understood that alternative embodiments, including those that may be described using the transitional phrases "consisting" or "consisting essentially of," are implied. Thus, for example, implied alternative embodiments to an apparatus that comprises A+B+C include embodiments where an apparatus consists of A+B+C and embodiments where an apparatus consists essentially of A+B+C.

It will be apparent to those skilled in the art that various modifications and variations can be made to the present disclosure without departing from the spirit and scope of the invention. Thus, it is intended that the present invention cover the modifications and variations of this disclosure provided they come within the scope of the appended claims and their equivalents.

What is claimed is:

1. An apparatus for drawing sheet glass comprising:
   a first pair of edge rolls configured to contact a first edge of a viscous ribbon of glass along the front and back sides;
   a second pair of edge rolls configured to contact a second edge of the viscous ribbon of glass along the front and back sides;
   wherein the first pair of edge rolls and the second pair of edge rolls are aligned with each other along a first line orthogonal to movement of the ribbon of glass;
   wherein at least one of the first pair of edge rolls and the second pair of edge rolls is oriented to provide a rotation axis that forms an angle between about 3 degrees and about 55 degrees from the first line; and
   wherein the first and second pair of edge rolls maintain a substantially consistent longitudinal velocity increase of the viscous ribbon of glass in a substantially parallel manner across a width of the viscous ribbon of glass downstream of the first and second pair of edge rolls, wherein the longitudinal velocity is in the direction of the movement of the ribbon of glass.

2. The apparatus of claim 1, wherein at least one of the first pair of edge rolls and the second pair of edge rolls are oriented to provide a rotation axis that forms an angle between about 5 degrees and about 30 degrees from the first line.

3. The apparatus of claim 1, further comprising a forming wedge having a pair of forming surfaces, the forming wedge being configured to provide for the flow of molten glass streams down the forming surfaces to join at a root, creating a viscous ribbon of glass.

4. The apparatus of claim 3, wherein the first pair of edge rolls and the second pair of edge rolls are aligned between about 3 cm and about 15 cm below the root.

5. The apparatus of claim 1, further comprising:
   a third pair of edge rolls configured to contact the first edge of a viscous ribbon of glass along the front and back sides;
   a fourth pair of edge rolls configured to contact the second edge of the viscous ribbon of glass along the front and back sides;
   wherein the third pair of edge rolls and the fourth pair of edge rolls are aligned with each other along a second line orthogonal to movement of the ribbon of glass; and
   wherein at least one of the third pair of edge rolls and the fourth pair of edge rolls is oriented to provide a rotation axis that forms an angle between about 0 degrees and about 55 degrees from the second line.

6. The apparatus of claim 5, wherein at least one of the third pair of edge rolls and the fourth pair of edge rolls are oriented to provide a rotation axis that forms an angle between about 5 degrees and about 30 degrees from the second line.

7. The apparatus of claim 5, wherein
   at least one or both of the first pair of edge rolls and the second pair of edge rolls are oriented to provide a rotation axis that forms an angle between about 0 degrees and about 55 degrees or between about 3 degrees and about 55 degrees from the second line, and
   at least one or both of the third pair of edge rolls and the fourth pair of edge rolls are oriented to provide a rotation axis that forms an angle between about 0 degrees and about 55 degrees from the second line.

8. The apparatus of claim 7, wherein the third pair of edge rolls and the fourth pair of edge rolls are oriented at an angle that is greater than the angle at which the first pair of edge rolls and the second pair of edge rolls are oriented.

9. The apparatus of claim 8, wherein
   the first pair of edge rolls and the second pair of edge rolls are oriented at an angle between about 3 degrees and about 20 degrees, and
   the third pair of edge rolls and the fourth pair of edge rolls are oriented at an angle between about 15 degrees and about 30 degrees.

10. The apparatus of claim 5, further comprising a forming wedge having a pair of forming surfaces, the forming wedge being configured to provide for the flow of molten glass streams down the forming surfaces to join at a root, creating a viscous ribbon of glass,
    wherein the first pair of edge rolls and the second pair of edge rolls are aligned between about 3 cm and about 12 cm below the root, and
    wherein the third pair of edge rolls and the fourth pair of edge rolls are aligned between about 13 cm and about 50 cm below the root.

11. A method for reducing sheet width attenuation of a drawing sheet glass comprising passing a viscous ribbon of glass through
    a first pair of edge rolls configured to contact a first edge of a viscous ribbon of glass along the front and back sides; and
    a second pair of edge rolls configured to contact a second edge of the viscous ribbon of glass along the front and back sides, wherein the first pair of edge rolls and the second pair of edge rolls are aligned with each other along a first line orthogonal to movement of the ribbon of glass, wherein at least one of the first pair of edge rolls and the second pair of edge rolls are oriented to provide a rotation axis that forms an angle between about 3 degrees and about 55 degrees from the first line; and wherein the first and second pair of edge rolls maintain, for the viscous ribbon of glass, a nearly consistent velocity in a substantially parallel manner across a width of the viscous ribbon of glass without decreasing a velocity of the viscous ribbon of glass in a direction parallel to the movement of the viscous ribbon of glass downstream of the first and second pair of edge rolls.

12. The method of claim 11, wherein the angle of the first and second pairs of edge rolls and the location of the first line are selected to reduce sheet width variation.

13. The method of claim 11, wherein the angle of the first and second pairs of edge rolls and the location of the first line are selected to produce a sheet glass having a ratio of bead thickness to center thickness that is less than about 5.

14. The method of claim 11, wherein the angle of the first and second pairs of edge rolls and the location of the first line are selected to produce a glass sheet having a width that is at about 90% of the width of the viscous glass ribbon at the root.

15. The method of claim 11, further comprising passing the viscous ribbon of glass through
 a third pair of edge rolls configured to contact the first edge of the viscous ribbon of glass along the front and back sides, and
 a fourth pair of edge rolls configured to contact the second edge of the viscous ribbon of glass along the front and back sides;
 wherein the third pair of edge rolls and the fourth pair of edge rolls are aligned with each other along a second line orthogonal to movement of the ribbon of glass; and
 wherein the third pair of edge rolls and the fourth pair of edge rolls are oriented to provide a rotation axis that forms an angle between about 0 degrees and about 55 degrees from the second line.

16. The method of claim 15, wherein the angle of the third and fourth pairs of edge rolls and the location of the second line are selected to produce a sheet glass having a ratio of bead thickness to center thickness that is less than about 3.

17. The method of claim 15, wherein the angle of the third and fourth pairs of edge rolls and the location of the second line are selected to produce a glass sheet having a width that is at about 94% of the width of the viscous glass ribbon at the root.

18. The method of claim 15, wherein the third pair of edge rolls and the fourth pair of edge rolls are oriented at an angle that is greater than the angle at which the first pair of edge rolls and the second pair of edge rolls are oriented.

19. The method of claim 18, wherein the first pair of edge rolls and the second pair of edge rolls are oriented at an angle between about 3 degrees and about 20 degrees, and
 wherein the third pair of edge rolls and the fourth pair of edge rolls are oriented at an angle between about 15 degrees and about 30 degrees.

20. The method of claim 15, wherein the sheet glass is fusion drawn from a root, and wherein the first pair of edge rolls and the second pair of edge rolls are aligned between about 3 cm and about 12 cm below the root, and
 wherein the third pair of edge rolls and the fourth pair of edge rolls are aligned between about 13 cm and about 50 cm below the root.

21. The method of claim 11, wherein each of the first pair of edge rolls and the second pairs of edge rolls are oriented to provide a rotation axis that forms an angle between about 5 degrees and about 30 degrees.

22. An apparatus for longitudinally drawing a viscous glass ribbon having a first side and an opposing second side, a first edge and an opposing second edge, and a width defined by a distance between the first and second edges, comprising:
 a first pair of edge rolls configured to contact the viscous glass ribbon along the first and second sides near the first edge; and
 a second pair of edge rolls configured to contact the viscous glass ribbon along the first and second sides near the second edge,
 wherein the first and second pair of edge rolls maintain a substantially consistent longitudinal velocity increase of the viscous glass ribbon in a substantially parallel manner across the width of the viscous glass ribbon downstream of the first and second pair of edge rolls.

* * * * *